United States Patent
Rahim et al.

(10) Patent No.: US 12,199,432 B2
(45) Date of Patent: Jan. 14, 2025

(54) SYSTEMS AND METHODS FOR REAL-TIME DETECTION AND MITIGATION OF POWER SYSTEM OSCILLATORY INSTABILITY

(71) Applicant: GE Infrastructure Technology LLC, Greenville, NC (US)

(72) Inventors: Muhammed Rahim, Spring, TX (US); Randall John Kleen, Channelview, TX (US); Esmeralda Soto Ruvalcaba, Queretaro (MX)

(73) Assignee: GE INFRASTRUCTURE TECHNOLOGY LLC, Greenville, SC (US)

( * ) Notice: Subject to any disclaimer, the term of this patent is extended or adjusted under 35 U.S.C. 154(b) by 390 days.

(21) Appl. No.: 17/546,270

(22) Filed: Dec. 9, 2021

(65) Prior Publication Data
US 2023/0187939 A1    Jun. 15, 2023

(51) Int. Cl.
| | |
|---|---|
| *H02J 3/24* | (2006.01) |
| *G05B 19/042* | (2006.01) |
| *H02J 3/38* | (2006.01) |

(52) U.S. Cl.
CPC .............. *H02J 3/24* (2013.01); *G05B 19/042* (2013.01); *H02J 3/381* (2013.01); *G05B 2219/25052* (2013.01)

(58) Field of Classification Search
CPC .......... H02J 3/24; H02J 3/381; H02J 2300/20; H02J 3/241; H02J 3/12; H02J 2203/20;
(Continued)

(56) References Cited

U.S. PATENT DOCUMENTS

| | | | |
|---|---|---|---|
| 5,068,591 A | * 11/1991 | Hoegberg | H02P 9/42 322/29 |
| 9,092,593 B2 | 7/2015 | Nasle | |

(Continued)

FOREIGN PATENT DOCUMENTS

| | | |
|---|---|---|
| CN | 103684158 A | 3/2014 |
| CN | 109119999 A | 1/2019 |

(Continued)

OTHER PUBLICATIONS

Willett., "Similarity-Based approaches to Virtual Screening", Biochem Soc Trans, pp. 603-606, Jun. 2003.
(Continued)

*Primary Examiner* — Charles Cai
(74) *Attorney, Agent, or Firm* — Armstrong Teasdale LLP

(57) ABSTRACT

A system for controlling a power system is provided. The system includes an automatic voltage regulator configured to transmit a pulse output voltage, a power system stabilizer in communication with the automatic voltage regulator, and a self-tuning computing device. The self-tuning computing device is programmed to: a) receive a plurality of sensor information of operation of a generator; b) detect an oscillation during the operation of the generator from the plurality of sensor information; c) determine a gain and a time constant to counteract the oscillation; and d) transmit, to the power system stabilizer, the gain and the time constant. The power system stabilizer is configured to instruct the automatic voltage regulator to adjust its pulse output voltage based on the gain and the time constant.

20 Claims, 6 Drawing Sheets

(58) Field of Classification Search
CPC ........ G05B 19/042; G05B 2219/25052; G06F 17/10; G01R 19/12; G01R 31/34
See application file for complete search history.

(56) References Cited

U.S. PATENT DOCUMENTS

| | | | |
|---|---|---|---|
| 9,633,315 | B2 | 4/2017 | Chapelle et al. |
| 9,864,820 | B2 | 1/2018 | Shokooh et al. |
| 10,371,740 | B2 | 8/2019 | Cui et al. |
| 2005/0104561 | A1* | 5/2005 | Kawabata ............... H02P 9/307 322/28 |
| 2013/0099582 | A1* | 4/2013 | Ray ........................ H02J 3/241 307/102 |
| 2014/0225626 | A1* | 8/2014 | Venkatasubramanian ................... G01R 19/2513 324/537 |
| 2015/0149128 | A1 | 5/2015 | Baone et al. |
| 2017/0147920 | A1 | 5/2017 | Huo et al. |
| 2018/0373824 | A1 | 12/2018 | Meagher et al. |
| 2023/0178990 | A1* | 6/2023 | Weber ...................... H02J 3/24 700/297 |

FOREIGN PATENT DOCUMENTS

| | | |
|---|---|---|
| CN | 106786671 B | 5/2019 |
| KR | 101115457 B1 * | 3/2012 |
| KR | 101219545 B1 | 1/2013 |
| WO | 2018120893 A1 | 7/2018 |

OTHER PUBLICATIONS

Conto et al., "Power system model validation", NERC White Paper, Dec. 2010.
Xu et al., "Response-Surface-Based Bayesian Inference for Power System Dynamic Parameter Estimation", IEEE Transactions on Smart Grid, pp. 1-11, Jan. 2019.
Kristensen et al., "Methods for Similarity-based Virtual Screening", Comput Struct Biotechnol, vol. 05, Issue: 06, pp. 1-6, 2013.
Jiao et al., "Load Model Verification, Validation and Calibration Framework by Statistical Analysis on Field Data", International Journal of Emerging Electric Power Systems, vol. 18, Issue: 06, pp. 1-7, Nov. 22, 2017.
Huang et al., "Generator Dynamic Model Validation and Parameter Calibration Using Phasor Measurements at the Point of Connection", IEEE Transactions on Power Systems, vol. No. 28, Issue No. 02, pp. 1939-1949, Mar. 26, 2013.
Ma et al., "Use Multi-Dimensional Ellipsoid to Monitor Dynamic Behavior of Power Systems Based on PMU Measurement", 2008 IEEE Power and Energy Society General Meeting—Conversion and Delivery of Electrical Energy in the 21st Century, Pittsburgh, PA, USA, pp. 1-8, Jul. 20-24, 2008.
Zarraga., "On-line Extraction of Modal Characteristics from Power System Measurements Based on Hilbert-Huang Analysis", 2009 6th International Conference on Electrical Engineering, Computing Science and Automatic Control (CCE), Conference Location: Toluca, Mexico, pp. 01-06, Jan. 10-13, 2009.
Allen et al., "Algorithm for Screening PMU Data for Power System Events", 2012 3rd IEEE PES Innovative Smart Grid Technologies Europe (ISGT Europe), Conference Location: Berlin, Germany, pp. 1-6, Oct. 14-17, 2012.
Zhang, Ruiliang et al., "Asynchronous Distributed ADMM for Consensus Optimization," Department of Computer Science and Engineering, Hong Kong University of Science and Technology, Hong Kong, 2014.

* cited by examiner

SYSTEMS AND METHODS FOR REAL-TIME DETECTION AND MITIGATION OF POWER SYSTEM OSCILLATORY INSTABILITY

BACKGROUND

The field of the disclosure relates generally to power system stability, and more particularly, to a system and method for real-time detection and mitigation of oscillatory instability in power systems using a self-tuning power system stabilizer (PSS).

In power systems, the power systems stabilizer (PSS) transmits a pulse to counteract oscillation of less than 3-5 Hertz in the power system. If the pulse is transmitted at the wrong time, the pulse could amplify the oscillation instead of mitigating. This amplification could cause a system collapse.

The oscillation can be from inter-area mode of oscillation, intra-area mode of oscillation, local mode oscillation, and intra-plant mode of oscillation. Inter-area mode of oscillation can occur between power systems over the transmission path. Intra-area mode oscillation can occur between groups of generators. Local mode oscillation can occur between a single generator and a large power system. Intra-plant mode oscillation can occur between a two unit station and a large power system.

Different organizations, such as North American Electric Reliability Coordinator (NERC), and local grid codes require that the PSS settings are reviewed after certain intervals, such as every two years. Traditional industry practice is to conduct offline studies in order to derive the settings for the PSS. These studies can require the associated power systems to be offline for up to a week. The lead lag filters of the PSS are traditionally designed to provide damping for a fixed oscillation frequency or a narrow range of frequencies close to it. However, power systems are dynamic systems and other poorly damped oscillation modes can appear over time. If these oscillations are outside of the PSS's tuned range, the PSS would not send any corrective signals. Furthermore, oscillation of less than 1 hertz is difficult for many current systems to detect.

Therefore, the satisfactory performance of the traditional PSS settings is limited to an operating point or a narrow frequency range for which it is tuned. Accordingly, a system and method for adjusting PSS settings that does not require downtime would be desirable.

BRIEF DESCRIPTION

In one aspect, a system for controlling a power system is provided. The system includes an automatic voltage regulator configured to transmit a pulse output voltage, a power system stabilizer in communication with the automatic voltage regulator, and a self-tuning computing device. The self-tuning computer includes at least one processor in communication with at least one memory device. The at least one processor is programmed to receive a plurality of sensor information of operation of a generator. The at least one processor is further programmed to detect an oscillation during operation of the generator from the plurality of sensor information. The at least one processor is also programmed to determine a gain and a time constant to counteract the oscillation. In addition, the at least one processor is programmed to transmit, to the power system stabilizer, the gain and the time constant. The power system stabilizer is configured to instruct the automatic voltage regulator to adjust its pulse output voltage based on the gain and the time constant.

In another aspect, a method for controlling a power system is provided. The method is performed by self-tuning computer system including at least one processor in communication with a power system stabilizer and at least one memory device. The method includes receiving a plurality of sensor information of operation of a generator. The method also includes detecting an oscillation during operation of the generator from the plurality of sensor information. The method further includes determining a gain and a time constant to counteract the oscillation. In addition, the method includes transmitting, to the power system stabilizer, the gain and the time constant. The power system stabilizer is configured to instruct an automatic voltage regulator to adjust its pulse output voltage based on the gain and the time constant.

In yet a further aspect, a computer device for controlling a power system is provided. The computer device includes at least one processor in communication with at least one memory device and a power system stabilizer. The at least one processor is programmed to receive a plurality of sensor information of operation of a generator. The at least one processor is also programmed to detect an oscillation during operation of the generator from the plurality of sensor information. The at least one processor is further programmed to determine a gain and a time constant to counteract the oscillation. In addition, the at least one processor is programmed to transmit, to the power system stabilizer, the gain and the time constant. The power system stabilizer is configured to instruct an automatic voltage regulator to adjust its pulse output voltage based on the gain and the time constant.

BRIEF DESCRIPTION OF THE DRAWINGS

The Figures described below depict various aspects of the systems and methods disclosed therein. It should be understood that each Figure depicts an embodiment of a particular aspect of the disclosed systems and methods, and that each of the Figures is intended to accord with a possible embodiment thereof. Further, wherever possible, the following description refers to the reference numerals included in the following Figures, in which features depicted in multiple Figures are designated with consistent reference numerals.

There are shown in the drawings arrangements which are presently discussed, it being understood, however, that the present embodiments are not limited to the precise arrangements and instrumentalities shown, wherein.

DETAILED DESCRIPTION

Figure 1:
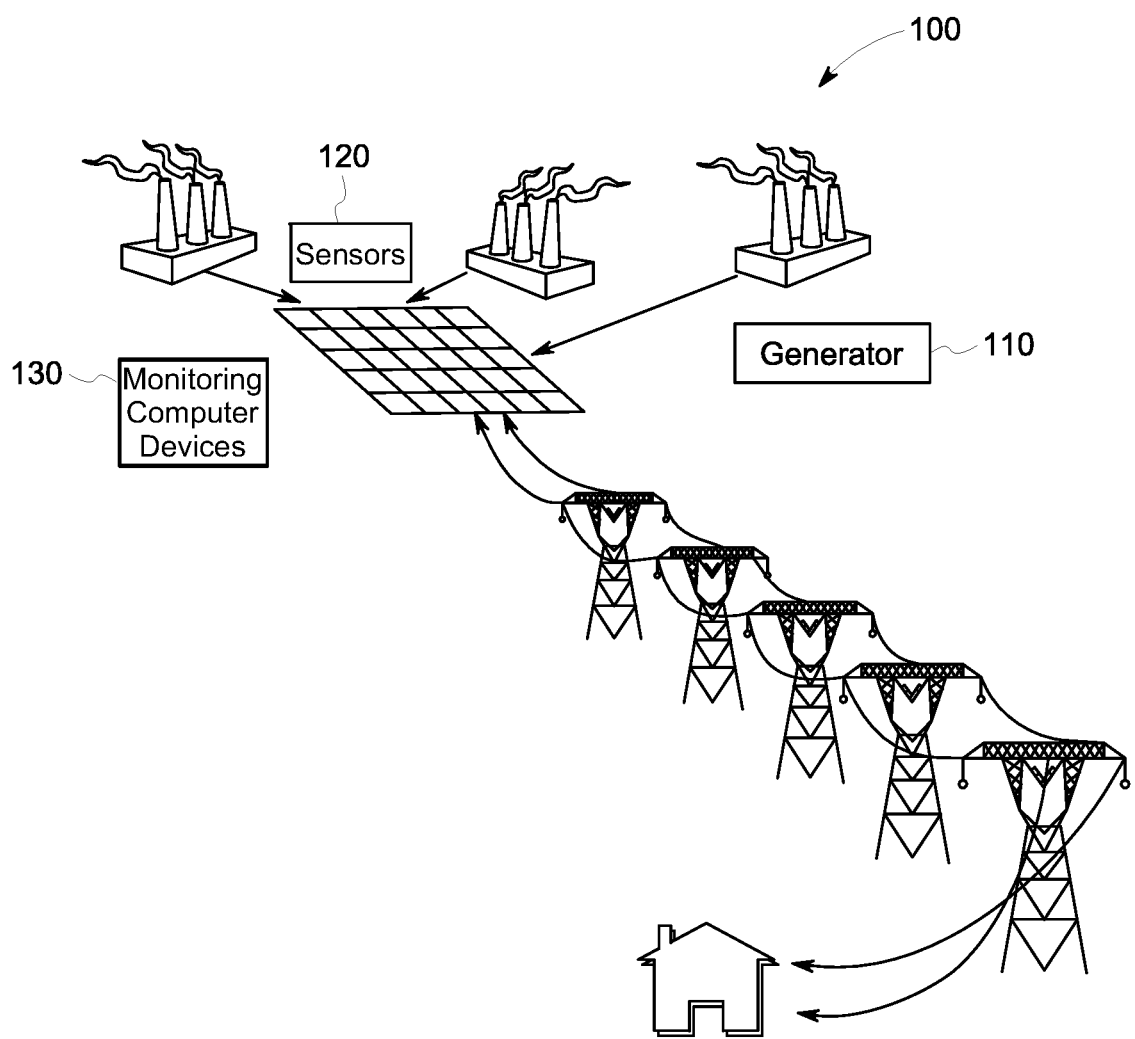
FIG. 1 illustrates a block diagram of a power distribution grid in accordance with at least one embodiment.

The field of the disclosure relates generally to power system stability, and more particularly, to a system and method for real-time detection and mitigation of oscillatory instability in power systems using a self-tuning power system stabilizer (PSS). The present disclosure addresses the oscillatory stability of synchronous machines relative to the power system by proposing a real-time, self-tuning approach to the PSS Gain & lead-lag filters of the automatic voltage regulator (AVR). Furthermore, the proposed method that dynamically generates the PSS Gain & time constant settings, such that the oscillatory instability of the machine is detected and mitigated in real-time under the prevailing operating conditions of the machine, across a wide range of oscillation modes (0-5 Hz).

The present disclosure includes automatic intelligent optimization with real time adjustments to the PSS gain settings to conform to customer requirements for grid connection and proper damping. The proposed system also utilizes the frequency of oscillation to determine the changes in phase angles necessary to determine the correct pulsed voltage output from the AVR.

In the following detailed description, numerous specific details are set forth in order to provide a thorough understanding of embodiments. However, it will be understood by those of ordinary skill in the art that the embodiments may be practiced without these specific details. In other instances, well-known methods, procedures, components and circuits have not been described in detail so as not to obscure the embodiments.

One or more specific embodiments are described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

Described herein are computer systems such as the PSS computer devices and related computer systems. As described herein, all such computer systems include a processor and a memory. However, any processor in a computer device referred to herein may also refer to one or more processors wherein the processor may be in one computing device or a plurality of computing devices acting in parallel. Additionally, any memory in a computer device referred to herein may also refer to one or more memories wherein the memories may be in one computing device or a plurality of computing devices acting in parallel.

As used herein, a processor may include any programmable system including systems using micro-controllers; reduced instruction set circuits (RISC), application-specific integrated circuits (ASICs), logic circuits, and any other circuit or processor capable of executing the functions described herein. The above examples are example only and are thus not intended to limit in any way the definition and/or meaning of the term "processor."

As used herein, the term "database" may refer to either a body of data, a relational database management system (RDBMS), or to both. As used herein, a database may include any collection of data including hierarchical databases, relational databases, flat file databases, object-relational databases, object-oriented databases, and any other structured collection of records or data that is stored in a computer system. The above examples are example only, and thus are not intended to limit in any way the definition and/or meaning of the term database. Examples of RDBMS' include, but are not limited to including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, California; IBM is a registered trademark of International Business Machines Corporation, Armonk, New York; Microsoft is a registered trademark of Microsoft Corporation, Redmond, Washington; and Sybase is a registered trademark of Sybase, Dublin, California.)

In another embodiment, a computer program is provided, and the program is embodied on a computer-readable medium. In an example embodiment, the system is executed on a single computer system, without requiring a connection to a server computer. In a further example embodiment, the system is being run in a Windows® environment (Windows is a registered trademark of Microsoft Corporation, Redmond, Washington). In yet another embodiment, the system is run on a mainframe environment and a UNIX® server environment (UNIX is a registered trademark of X/Open Company Limited located in Reading, Berkshire, United Kingdom). In a further embodiment, the system is run on an iOS® environment (iOS is a registered trademark of Cisco Systems, Inc. located in San Jose, CA). In yet a further embodiment, the system is run on a Mac OS® environment (Mac OS is a registered trademark of Apple Inc. located in Cupertino, CA). In still yet a further embodiment, the system is run on Android® OS (Android is a registered trademark of Google, Inc. of Mountain View, CA). In another embodiment, the system is run on Linux® OS (Linux is a registered trademark of Linus Torvalds of Boston, MA). The application is flexible and designed to run in various different environments without compromising any major functionality.

The application is flexible and designed to run in various different environments without compromising any major functionality. In some embodiments, the system includes multiple components distributed among a plurality of computer devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes. The present embodiments may enhance the functionality and functioning of computers and/or computer systems.

As used herein, an element or step recited in the singular and proceeded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

As used herein, the terms "software" and "firmware" are interchangeable and include any computer program stored in memory for execution by a processor, including RAM memory, ROM memory, EPROM memory, EEPROM memory, and non-volatile RAM (NVRAM) memory. The above memory types are example only and are thus not limiting as to the types of memory usable for storage of a computer program.

Furthermore, as used herein, the term "real-time" refers to at least one of the time of occurrence of the associated events, the time of measurement and collection of predetermined data, the time to process the data, and the time of a system response to the events and the environment. In the embodiments described herein, these activities and events occur substantially instantaneously.

As used herein, the term "low frequencies" refers to frequencies under 100 Hertz, especially inaudible frequencies, such as those under 25 Hertz.

The systems and processes are not limited to the specific embodiments described herein. In addition, components of each system and each process can be practiced independent and separate from other components and processes described herein. Each component and process also can be used in combination with other assembly packages and processes.

FIG. 1 illustrates a power distribution grid 100. The grid 100 includes a number of components, such as power generators 110. In some cases, manual planning studies conducted can predict stable grid 100 operation, but the actual grid 100 may become unstable within a few minutes with severe swings (resulting in a massive blackout), such as from improper parameters for the power system stabilizer (PSS). To ensure that the PSS is properly calibrated, the North American Electric Reliability Coordinator ("NERC"), and other grid regulator or grid codes, requires that the PSS of generators 110 be calibrated on a regular basis, such as every two years, to ensure that the parameters, such as gain setting and time constant setting, are correct.

The grid 100 also includes a plurality of sensors 120 at a plurality of locations that measure attributes of the grid 100, including, but not limited to, active power (P) reactive power (Q), shaft speed, voltage (U), current (I), and oscillation frequency ($\omega$). In the exemplary embodiment, the plurality of sensors 120 are in communication with one or more monitoring computer devices 130 used for monitoring and running the generators 110. The plurality of sensors 120 and the monitoring computer device 130 allow the generator owner to know the current conditions of the grid 100 and their generator(s) 110.

Figure 2:
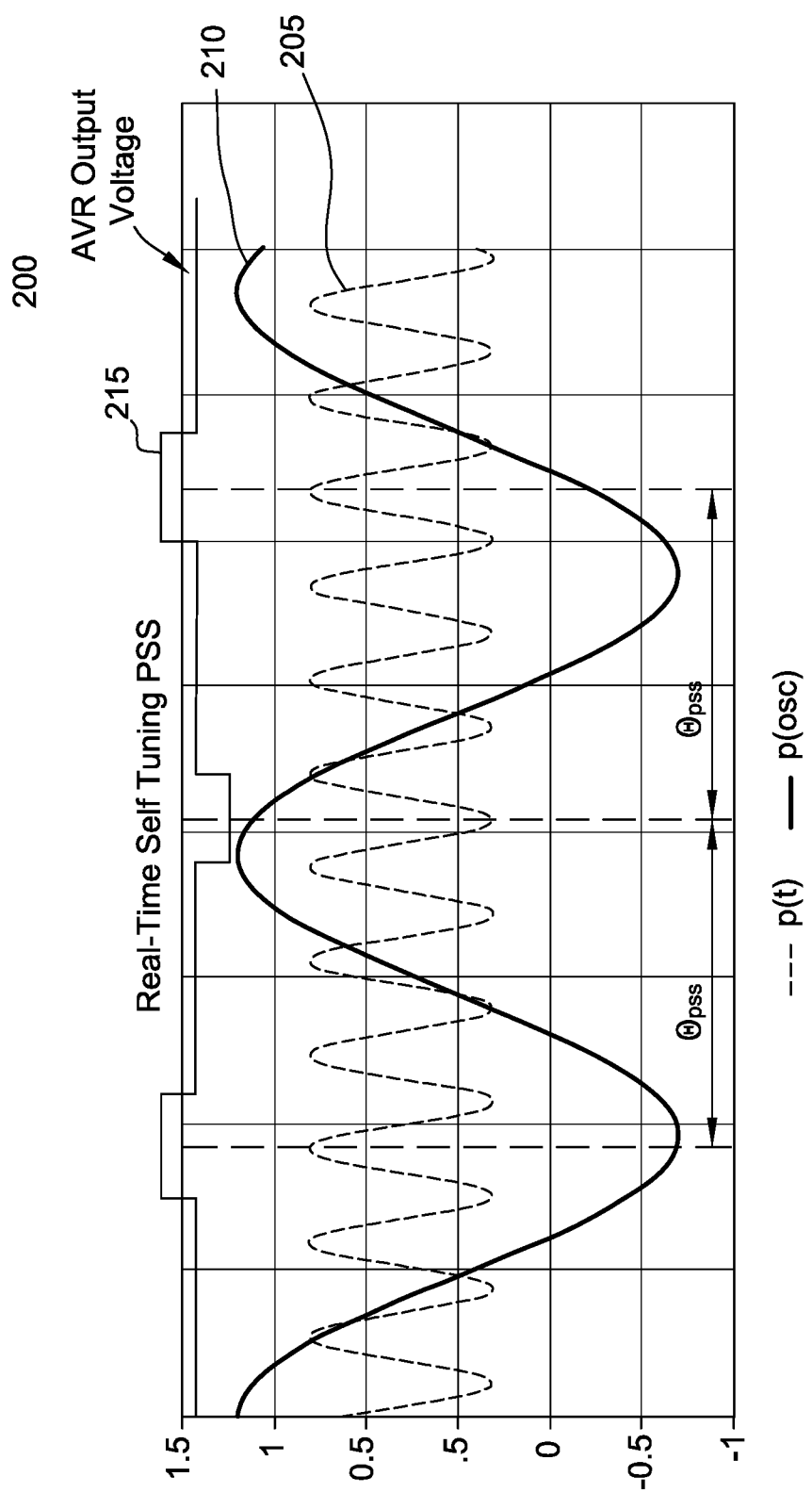
FIG. 2 illustrates a graph of output voltages of the power distribution grid shown in FIG. 1.

FIG. 2 illustrates a graph 200 of output voltages of the power distribution grid 100 (shown in FIG. 1). Graph 200 displays the voltage on the y-axis and time on the x-axis. Line 205 illustrates the 50-60 Hz of the generators 110 (shown in FIG. 1) on the power grid 100. Line 210 illustrates the oscillation of the generators 110 or other equipment on the power grid 100. The oscillation can also be signified as $\omega_{OSC}$, which can range from 0.05 Hz to 5 Hz. Line 215 illustrates the output voltage of the automatic voltage regulator (AVR), which is used to counteract the oscillation shown in Line 210. The goal of the AVR is to produce the output voltage at the right time to negate the oscillation.

Figure 3:
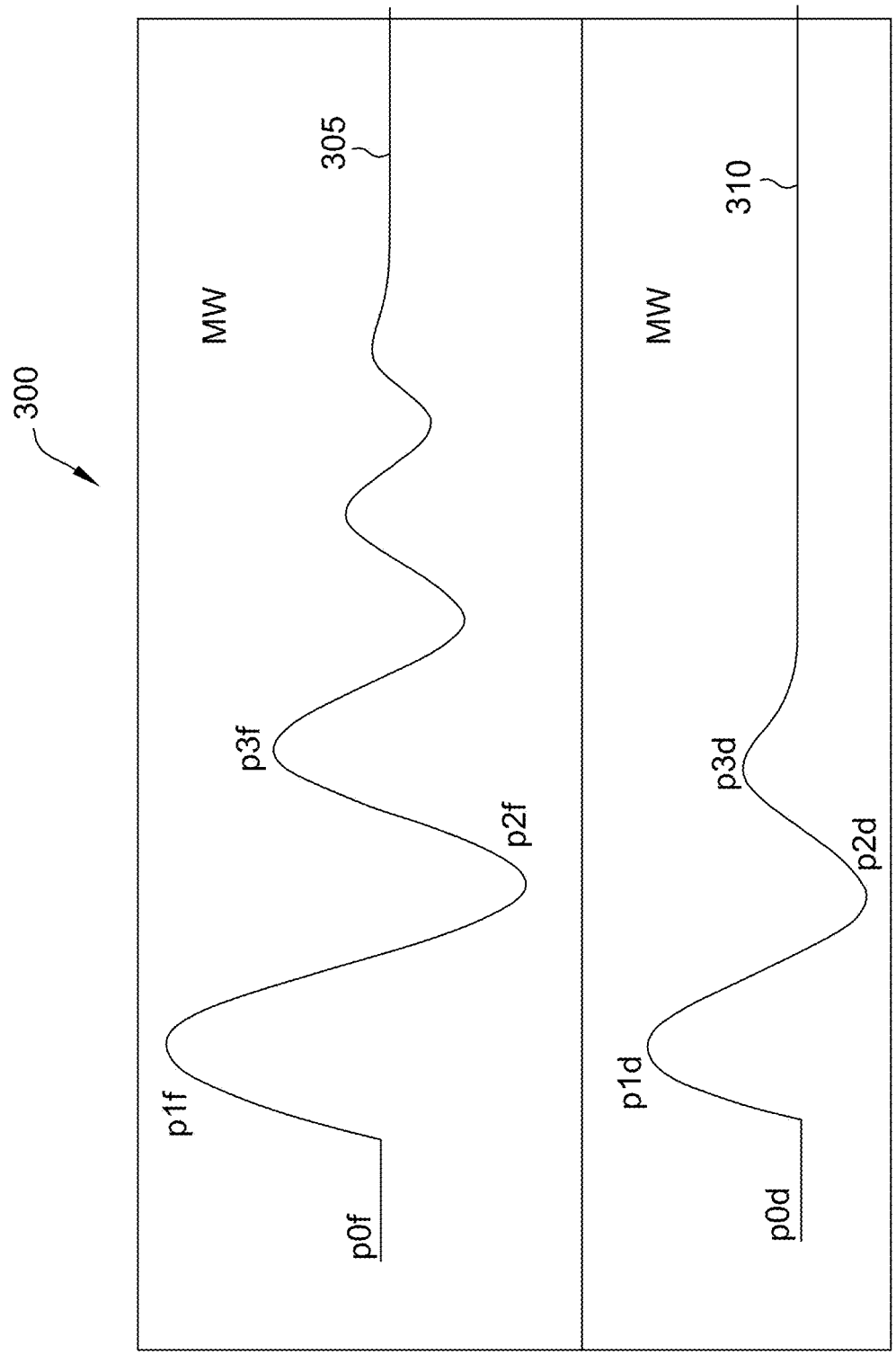
FIG. 3 illustrates a graph comparing non-dampened signals to dampened signals in accordance with at least one embodiment.

FIG. 3 illustrates a graph 300 comparing non-dampened signals 305 to dampened signals 310 in accordance with at least one embodiment. The non-dampened signals 305 illustrate the signals without PSS dampening. The dampened signals 310 illustrates the signals with PSS dampening. The PSS dampening greatly reduces the oscillation in the grid 100 (shown in FIG. 1). Accordingly, it is advantageous to have the correct values (amplitude and phase angle) for the PSS.

Figure 4:
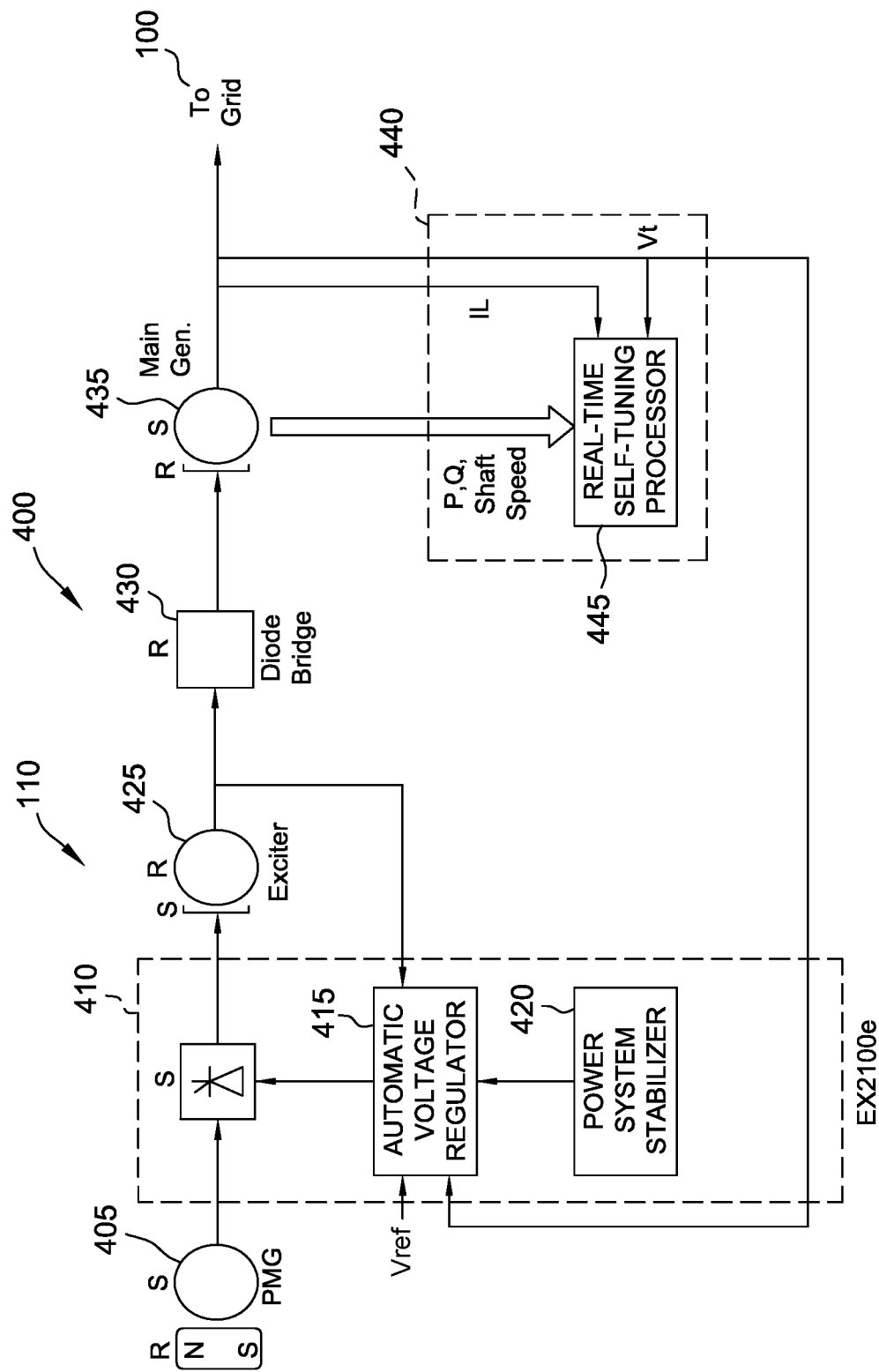
FIG. 4 illustrates a real-time tuning system in accordance with at least one embodiment.

FIG. 4 illustrates a real-time tuning system 400 in accordance with at least one embodiment. In the exemplary embodiment, real-time tuning system 400 includes generator 110. As shown here in FIG. 4, the real-time tuning system 400 includes a permanent magnet generator (PMG) 405 connected to the power control block 410. The power control block 410 includes at least an automatic voltage regulator (AVR) 415 and a power system stabilizer (PSS) 420. The PMG 405 provides stable and reliable energy for the AVR 415.

An exciter 425 provides a supply of DC power for the field winding of a generator 435 though a diode bridge 430. The exciter 425 can be for a separately excited generator or a self-excited generator. In a separately excited generator, the DC supply to the generator 435 is made available from a separate source, which has not connection the generator's own generating supply. In a self-excited generator, the DC supply to the generator 435 is temporarily given from the other source. Once the voltage is built up in the generator 435, the source is changed to the generator's own generating supply.

The generator 435 produces the power to be output to the grid 100. A plurality of sensors 120 (shown in FIG. 1) determine the active power (P), the reactive power (Q), the shaft speed, the current (I), and the output voltage (V) of the generator 435. In the present system instead of feeding these values directly into the power control block 410, the sensor readings are passed to the self-tuning block 440. The self-tuning block 440 includes a real-time self-tuning processor 445 (also known as a self-tuning computer device). The real-time self-tuning processor 445 receives the sensor values and determines whether or not the generator 435 is producing oscillation, what is the frequency of the oscillation, and determines the gain and time constants for the PSS to counteract the detected oscillation. The real-time self-tuning processor 445 transfers the gain and time constants to the PSS 420 to adjust the output voltage of the AVR 415 to counteract the oscillation. This cycle continues such that any detected oscillation is counteracted soon after it is detected.

As used herein, devices, including those associated with the system 400 and any other device described herein, may exchange information via any communication network which may be one or more of a Local Area Network ("LAN"), a Metropolitan Area Network ("MAN"), a Wide Area Network ("WAN"), a proprietary network, a Public Switched Telephone Network ("PSTN"), a Wireless Application Protocol ("WAP") network, a Bluetooth network, a wireless LAN network, and/or an Internet Protocol ("IP") network such as the Internet, an intranet, or an extranet. Note that any devices described herein may communicate via one or more such communication networks.

The real-time self-tuning processor 445 may store information into and/or retrieve information from various data stores, which may be locally stored or reside remote from the real-time self-tuning processor 445. Although a real-time self-tuning processor 445 is shown in FIG. 4, any number of such devices may be included. Moreover, various devices described herein might be combined according to embodiments of the present disclosure. For example, in some embodiments, the control block 410 and the real-time self-tuning processor 445 might be implemented as a single apparatus. The system 400 functions may be performed by a constellation of networked apparatuses, such as in a distributed processing or cloud-based architecture.

A user may access the system 400 via a device (e.g., a Personal Computer ("PC"), tablet, or smartphone), such as monitoring computer device 130 (shown in FIG. 1) to view information about and/or manage operational information in accordance with any of the embodiments described herein.

In some cases, an interactive graphical user interface display may let an operator or administrator define and/or adjust certain parameters (e.g., when new PSS parameters are manually generated) and/or provide or receive automatically generated recommendations or results from the system 400.

Figure 5:
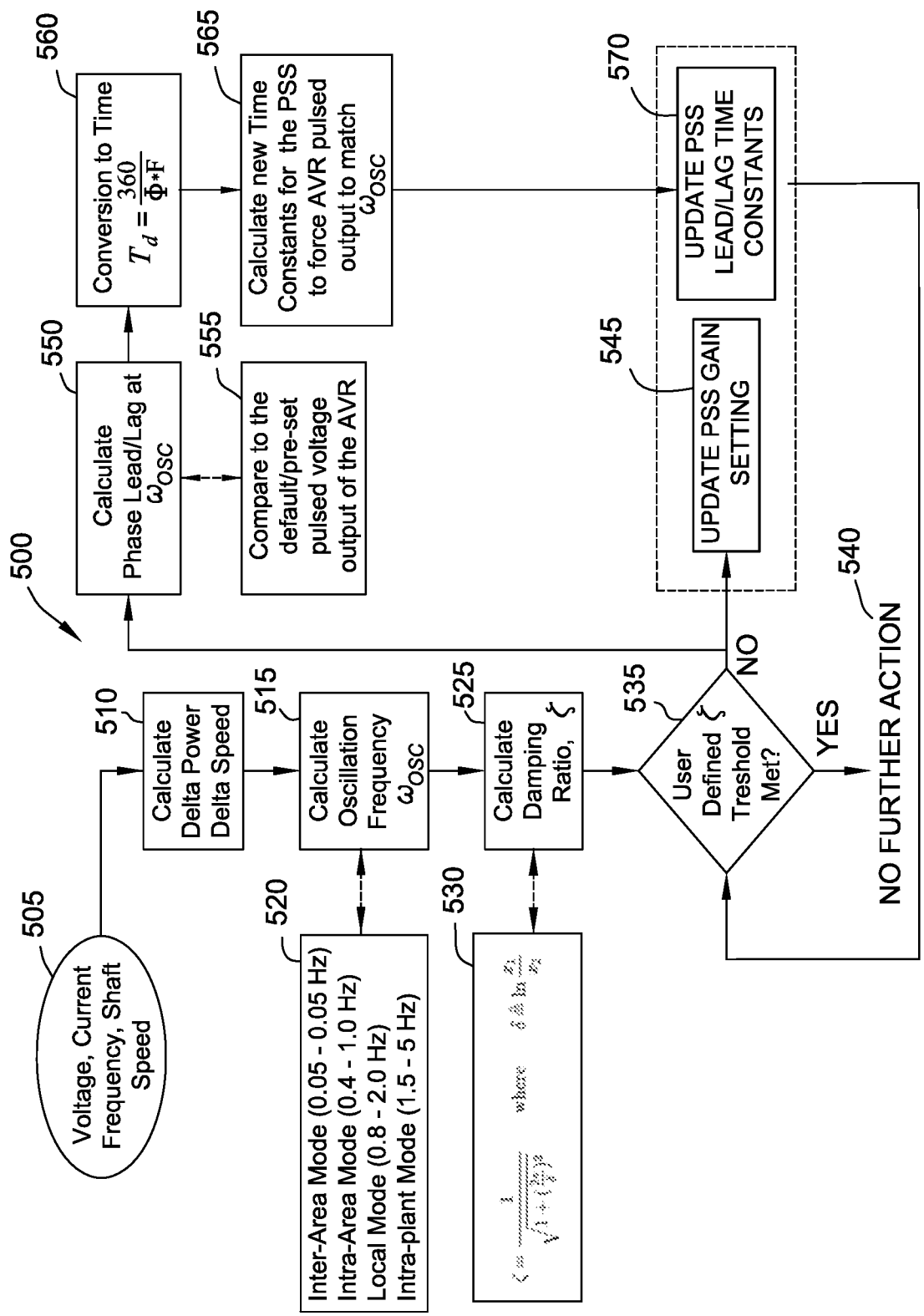
FIG. 5 illustrates a process for real-time tuning using the system shown in FIG. 4.

FIG. 5 illustrates a process 500 for real-time tuning using the system 400 (shown in FIG. 4). In the exemplary embodiment, the steps of process 500 are performed by the real-time self-tuning processor 445.

In the exemplary embodiment, the real-time self-tuning processor 445 receives 505 a plurality of sensor information from a plurality of sensors 120 (shown in FIG. 2). The sensor information can include, but is not limited to, voltage, current, frequency, and shaft speed. The real-time self-tuning processor 445 calculates 510 delta power (ΔP) and delta speed (Δδ) are processed signals based on the plurality of sensor information. The real-time self-tuning processor 445 calculates 515 the oscillation frequency ($\omega_{OSC}$) using the delta power (ΔP) and delta speed (ΔS). The delta power (ΔP) and delta speed (ΔS) are processed inside the self-tuning processor 445 to determine 520 the oscillation frequency ($\omega_{OSC}$) based on the raw input signals of voltage, current, frequency, and shaft speed.

The oscillation frequency ($\omega_{OSC}$) is based 520 on one of more of the Inter-Area Mode, the Intra-Area Mode, the Local Mode, and the Intra-plant Mode. For the purposes of this discussion, the Inter-Area Mode is between 0.05 Hz and 0.5 Hz, the Intra-Area Mode is between 0.4 Hz and 1.0 Hz, the Local Mode is between 0.8 Hz and 2.0 Hz, and the Intra-Plant Mode is between 1.5 Hz and 5 Hz.

In the exemplary embodiment, the real-time self-tuning processor 445 calculates 525 a damping ratio (ζ) based 530 on Equation 1, shown below.

$$\zeta = 1/\sqrt{1+(2\pi/\delta)^2} \quad \text{EQ. 1}$$

where δ is calculated based 530 on Equation 2, shown below.

$$\delta \approx \ln x_1/x_2 \quad \text{EQ. 2}$$

where $x_1$ and $x_2$ are the vibration amplitudes at two successive peaks of the decaying vibration.

The real-time self-tuning processor 445 compares 535 the damping ratio (ζ) to a user defined threshold. If the user defined threshold is met, then the real-time self-tuning processor 445 takes no further action 540 and returns to step 505. If the user defined threshold is not met, the real-time self-tuning processor 445 updates 545 the PSS gain setting. If the damping threshold is not met, then PSS gain setting will be adjusted (increased) until the threshold is met. The smallest step increase can be a user-defined input.

The real-time self-tuning processor 445 also calculates 550 phase lead or lag at the oscillation frequency ($\omega_{OSC}$). This is compared 555 to the default or pre-set pulsed voltage output of the AVR 415 (shown in FIG. 4) determine if there is a phase angle mismatch between the oscillation frequency ($\omega_{OSC}$) and the AVR pulsed output voltage. The real-time self-tuning processor 445 converts 560 the frequency to the time domain, such as through Equation 3 shown below.

$$T_d = 360/\phi * F \quad \text{EQ. 3}$$

where F is the oscillation frequency ($\omega_{OSC}$), and φ is the phase angle difference between the two waveforms, i.e., $\omega_{OSC}$ and AVR pulsed output.

The real-time self-tuning processor 445 calculates 565 new time constants for the PSS 420 to force the AVR 415 pulsed output (shown in Line 215 in FIG. 2) to match the oscillation frequency ($\omega_{OSC}$) (shown in Line 210 in FIG. 2).

The real-time self-tuning processor 445 updates 570 the PSS 420 lead or lag time constants. The PSS 420 uses the updated gain setting and updated lead/lag time constants to The real-time self-tuning processor 445 returns to step 535 and compares the results to the user defined threshold. In some embodiments, the real-time self-tuning processor 445 repeats steps 535 through 570 until the user defined threshold is met. In other embodiments, the real-time self-tuning processor 445 repeats process 500 at step 505 until the user defined threshold is met.

In the exemplary embodiment, process 500 allows the system 400 to be tuned quickly, efficiently, and when changes in the oscillation occur, rather than waiting for the offline adjustment every two years. In some embodiments, the real-time self-tuning processor 445 is left active all of the time to adjust for changes in oscillation whenever they occur. In other embodiments, real-time self-tuning processor 445 is activated on a regular basis, such as, but not limited to, daily, once a week, and/or once a month.

In some embodiments, process 500 may be performed by a model which can be used to replace the real-time self-tuning processor 445 when updating the PSS gain and time constants. The model can be trained based on historical behavior of the generator 435 thereby learning patterns between inputs and outputs of the generator. The model can emulate the functionality performed by the generator 435 to determine which inputs and/or conditions provide oscillation and how to counter or mitigate that oscillation. Instead, the model can predict (e.g., via a neural network, or the like) a subset of parameters for PSS 420 and AVR 415 calibration.

Figure 6:
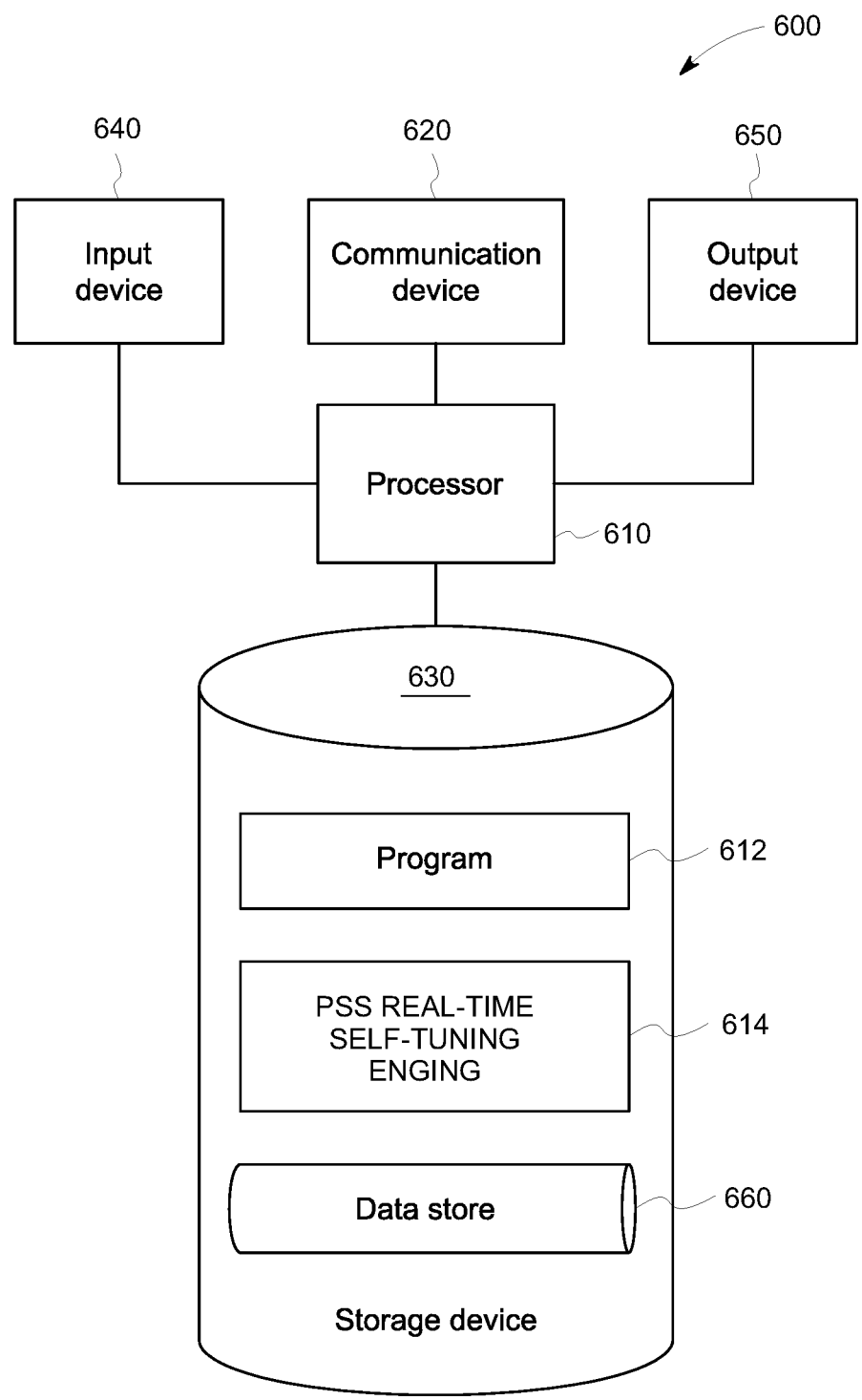
FIG. 6 is a diagram illustrating an exemplary apparatus or platform according to some embodiments.

FIG. 6 is a diagram illustrating an exemplary apparatus or platform 600 according to some embodiments. The embodiments described herein may also be implemented using any number of different hardware configurations. For example, apparatus or platform 600 may be, for example, associated with the system 400 of FIG. 4 and/or any other system described herein. The platform 600 comprises a processor 610, such as one or more commercially available Central Processing Units ("CPUs") in the form of one-chip microprocessors, coupled to a communication device 620 configured to communicate via a communication network (not shown in FIG. 6). The communication device 620 may be used to communicate, for example, with one or more remote measurement units, components, user interfaces, etc. The platform 600 further includes an input device 640 (e.g., a computer mouse and/or keyboard to input power grid and/or modeling information) and/an output device 650 (e.g., a computer monitor to render a display, provide alerts, transmit recommendations, and/or create reports). According to some embodiments, a mobile device, monitoring physical system, and/or PC may be used to exchange information with the platform 600.

The processor 610 also communicates with a storage device 630. The storage device 630 may comprise any appropriate information storage device, including combinations of magnetic storage devices (e.g., a hard disk drive), optical storage devices, mobile telephones, and/or semiconductor memory devices. The storage device 630 stores a program 612 and/or a PSS real-time self-tuning engine 614 for controlling the processor 610. The processor 610 performs instructions of the programs 612, 614, and thereby operates in accordance with any of the embodiments described herein. For example, the processor 610 may tune the output of a power system stabilizer. The processor 610 may receive, from a measurement data store 660, measurement data measured by an electrical power system measurement unit (e.g., a power measurement unit, digital fault recorder, or other means of measuring frequency, voltage, current, or power). The processor 610 may then iteratively determine parameters for the PSS to counteract any detected oscillation. The system parameters of the PSS may be determined by solving the optimization problem with an iterative method until at least one user defined threshold is met.

The programs 612, 614 may be stored in a compressed, uncompiled and/or encrypted format. The programs 612, 614 may furthermore include other program elements, such as an operating system, tuning application, a database management system, and/or device drivers used by the processor 610 to interface with peripheral devices.

Further aspects of the disclosure are provided by the subject matter of the following clauses:

1. A system for controlling a power system comprising: an automatic voltage regulator configured to transmit a pulse output voltage; a power system stabilizer in communication with the automatic voltage regulator; and a self-tuning computing device comprising at least one processor in communication with at least one memory device, wherein said at least one processor is programmed to: receive a plurality of sensor information of operation of a generator; detect an oscillation during operation of the generator from the plurality of sensor information; determine a gain and a time constant to counteract the oscillation; and transmit, to the power system stabilizer, the gain and the time constant, wherein the power system stabilizer is configured to instruct the automatic voltage regulator to adjust its pulse output voltage based on the gain and the time constant.

2. The system of any preceding clause, wherein the plurality of sensor information is received at a first time, and wherein the at least one processor is further programmed to: receive a second plurality of sensor information at a subsequent time; detect a current oscillation during the operation of the generator from the plurality of sensor information; determine an updated gain and an updated time constant to counteract the current oscillation; and transmit, to the power system stabilizer, the updated gain and the updated time constant, wherein the power system stabilizer is configured to instruct the automatic voltage regulator to re-adjust its pulse output voltage based on the updated gain and the updated time constant.

3. The system of any preceding clause, wherein the at least one processor is further programmed to: calculate a current damping ratio based on the plurality of sensor information; and compare current damping ratio to a user defined threshold.

4. The system of any preceding clause, wherein the at least one processor is further programmed to determine the gain based on the comparison.

5. The system of any preceding clause, wherein the at least one processor is further programmed to determine a phase lead or a phase lag for the pulse output voltage of the automatic voltage regulator by comparing the oscillation to the pulse output voltage.

6. The system of any preceding clause, wherein the pulse output voltage is configured to counteract the oscillation.

7. The system of any preceding clause, wherein the at least one processor is further programmed to calculate the time constant to align the pulse output voltage with the oscillation.

8. The system of any preceding clause, wherein the plurality of sensor information includes a voltage of the generator, a current of the generator, a frequency of the generator, and a shaft speed of the generator.

9. A method for controlling a power system, the method performed by self-tuning computer system including at least one processor in communication with a power system stabilizer and at least one memory device, the method comprising: receiving a plurality of sensor information of operation of a generator; detecting an oscillation during operation of the generator from the plurality of sensor information; determining a gain and a time constant to counteract the oscillation; and transmitting, to the power system stabilizer, the gain and the time constant, wherein the power system stabilizer is configured to instruct an automatic voltage regulator to adjust its pulse output voltage based on the gain and the time constant.

10. The method of any preceding clause, wherein the plurality of sensor information is received at a first time, and wherein the method further comprises: receiving a second plurality of sensor information at a subsequent time; detecting a current oscillation during the operation of the generator from the plurality of sensor information; determining an updated gain and an updated time constant to counteract the current oscillation; and transmitting, to the power system stabilizer, the updated gain and the updated time constant, wherein the power system stabilizer is configured to instruct the automatic voltage regulator to re-adjust its pulse output voltage based on the updated gain and the updated time constant.

11. The method of any preceding clause further comprising: calculating a current damping ratio based on the plurality of sensor information; and comparing current damping ratio to a user defined threshold.

12. The method of any preceding clause further comprising determining the gain based on the comparison.

13. The method of any preceding clause further comprising determining a phase lead or a phase lag for the pulse output voltage of the automatic voltage regulator by comparing the oscillation to the pulse output voltage.

14. The method of any preceding clause, wherein the pulse output voltage is configured to counteract the oscillation.

15. The method of any preceding clause further comprising calculating the time constant to align the pulse output voltage with the oscillation.

16. The method of any preceding clause, wherein the plurality of sensor information includes a voltage of the generator, a current of the generator, a frequency of the generator, and a shaft speed of the generator.

17. A computer device for controlling a power system comprising at least one processor in communication with at least one memory device and a power system stabilizer, wherein the at least one processor is programmed to: receive a plurality of sensor information of operation of a generator; detect an oscillation during operation of the generator from the plurality of sensor information; determine a gain and a time constant to counteract the oscillation; and transmit, to the power system stabilizer, the gain and the time constant, wherein the power system stabilizer is configured to instruct an automatic voltage regulator to adjust its pulse output voltage based on the gain and the time constant.

18. The computer device of any preceding clause, wherein the plurality of sensor information is received at a first time, and wherein the at least one processor is further programmed to: receive a second plurality of sensor information at a subsequent time; detect a current oscillation during the operation of the generator from the plurality of sensor information; determine an updated gain and an updated time constant to counteract the current oscillation; and transmit, to the power system stabilizer, the updated gain and the updated time constant, wherein the power system stabilizer is configured to instruct the automatic voltage regulator to re-adjust its pulse output voltage based on the updated gain and the updated time constant.

19. The computer device of any preceding clause, wherein the at least one processor is further programmed to: calculate a current damping ratio based on the plurality of sensor information; compare current damping ratio to a user defined threshold; and determine the gain based on the comparison.

20. The computer device of any preceding clause, wherein the pulse output voltage is configured to counteract the oscillation, and wherein the at least one processor is further programmed to calculate the time constant to align the pulse output voltage with the oscillation.

As used herein, information may be "received" by or "transmitted" to, for example: (i) the platform 600 from another device; or (ii) a software application or module within the platform 600 from another software application, module, or any other source.

At least one of the technical solutions provided by this system to the technical problems may include: (i) more robust performance of the PSS; (ii) improved overall power system reliability; (iii) savings due to reduced offline PSS training studies; (iv) reduction in amount of site support hours needed; (v) reduction in periodic NERC testing; and (vii) no incremental cost after deployment.

The methods and systems described herein may be implemented using computer programming or engineering techniques including computer software, firmware, hardware, or any combination or subset thereof, wherein the technical effects is achieved by performing at least one of the following steps: a) receive a plurality of sensor information of operation of a generator, wherein the plurality of sensor information is received at a first time; b) detect an oscillation during operation of the generator from the plurality of sensor information, and wherein the plurality of sensor information includes a voltage of the generator, a current of the generator, a frequency of the generator, and a shaft speed of the generator; c) determine a gain and a time constant to counteract the oscillation; d) transmit, to the power system stabilizer, the gain and the time constant, wherein the power system stabilizer is configured to instruct the automatic voltage regulator to adjust its pulse output voltage based on the gain and the time constant; e) receive a second plurality of sensor information at a subsequent time; f) detect a current oscillation during the operation of the generator from the plurality of sensor information; g) determine an updated gain and an updated time constant to counteract the current oscillation; h) transmit, to the power system stabilizer, the updated gain and the updated time constant, wherein the power system stabilizer is configured to instruct the automatic voltage regulator to re-adjust its pulse output voltage based on the updated gain and the updated time constant; i) calculate a current damping ratio based on the plurality of sensor information; j) compare current damping ratio to a user defined threshold; k) determine the gain based on the comparison; l) determine a phase lead or a phase lag for the output voltage of the automatic voltage regulator by comparing the oscillation to the output voltage, wherein the pulse output voltage is configured to counteract the oscillation; and m) calculate the time constant to align the pulse output voltage with the oscillation.

The computer-implemented methods discussed herein may include additional, less, or alternate actions, including those discussed elsewhere herein. The methods may be implemented via one or more local or remote processors, transceivers, servers, and/or sensors, and/or via computer-executable instructions stored on non-transitory computer-readable media or medium.

Additionally, the computer systems discussed herein may include additional, less, or alternate functionality, including that discussed elsewhere herein. The computer systems discussed herein may include or be implemented via computer-executable instructions stored on non-transitory computer-readable media or medium.

As will be appreciated based upon the foregoing specification, the above-described embodiments of the disclosure may be implemented using computer programming or engineering techniques including computer software, firmware, hardware or any combination or subset thereof. Any such resulting program, having computer-readable code means, may be embodied or provided within one or more computer-readable media, thereby making a computer program product, i.e., an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium, such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

In some embodiments, the system includes multiple components distributed among a plurality of computer devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes. The present embodiments may enhance the functionality and functioning of computers and/or computer systems.

As used herein, an element or step recited in the singular and preceded by the word "a" or "an" should be understood as not excluding plural elements or steps, unless such exclusion is explicitly recited. Furthermore, references to "example embodiment," "exemplary embodiment," or "one embodiment" of the present disclosure are not intended to be interpreted as excluding the existence of additional embodiments that also incorporate the recited features.

As used herein, the term "non-transitory computer-readable media" is intended to be representative of any tangible computer-based device implemented in any method or technology for short-term and long-term storage of information, such as, computer-readable instructions, data structures, program modules and sub-modules, or other data in any device. Therefore, the methods described herein may be encoded as executable instructions embodied in a tangible, non-transitory, computer readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, including, without limitation, non-transitory computer storage devices, including, without limitation, volatile and nonvolatile media, and removable and non-removable media such as a firmware, physical and virtual storage, CD-ROMs, DVDs, and any other digital source such as a network or the Internet, as well as yet to be developed digital means, with the sole exception being a transitory, propagating signal.

The patent claims at the end of this document are not intended to be construed under 35 U.S.C. § 112(f) unless traditional means-plus-function language is expressly recited, such as "means for" or "step for" language being expressly recited in the claim(s).

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

The invention claimed is:

1. A system for controlling a power system comprising:
   an automatic voltage regulator configured to transmit a pulse output voltage;
   a power system stabilizer in communication with the automatic voltage regulator; and
   a self-tuning computing device comprising at least one processor in communication with at least one memory device, wherein said at least one processor is programmed to:
   receive a plurality of sensor information of operation of a generator;
   detect an oscillation during operation of the generator from the plurality of sensor information;
   calculate a current damping ratio based on the plurality of sensor information including one or more vibration amplitudes;
   compare the current damping ratio to a user defined threshold range to make a determination whether the current damping ration is within a user defined range;
   in response to the determination that the current damping ratio is not within the user defined threshold range, convert the oscillation into the time domain;
   in response to the determination that the current damping ratio is not within the user defined threshold range, determine a gain and a time constant to counteract the oscillation based upon the time domain oscillation; and
   in response to the determination that the current damping ratio is not within the user defined threshold range, transmit, to the power system stabilizer, the gain and the time constant, wherein the power system stabilizer is configured to instruct the automatic voltage regulator to adjust its pulse output voltage based on the gain and the time constant.

2. The system in accordance with claim 1, wherein the plurality of sensor information is received at a first time, and wherein the at least one processor is further programmed to:
   receive a second plurality of sensor information at a subsequent time;
   detect a second oscillation during the operation of the generator from the second plurality of sensor information;
   determine an updated gain and an updated time constant to counteract the second oscillation; and
   transmit, to the power system stabilizer, the updated gain and the updated time constant, wherein the power system stabilizer is configured to instruct the automatic voltage regulator to re-adjust its pulse output voltage based on the updated gain and the updated time constant.

3. The system in accordance with claim 1, wherein the at least one processor is further programmed to in response to the determination that the current damping ratio is not within the user defined threshold range, increase the gain.

4. The system in accordance with claim 1, wherein the at least one processor is further programmed to determine a phase lead or a phase lag for the pulse output voltage of the automatic voltage regulator by comparing the oscillation to the pulse output voltage.

5. The system in accordance with claim 1, wherein the pulse output voltage is configured to counteract the oscillation.

6. The system in accordance with claim 5, wherein the at least one processor is further programmed to calculate the time constant to align the pulse output voltage with the oscillation.

7. The system in accordance with claim 1, wherein the plurality of sensor information includes a voltage of the generator, a current of the generator, a frequency of the generator, and a shaft speed of the generator.

8. A method for controlling a power system, the method performed by self-tuning computer system including at least one processor in communication with a power system stabilizer and at least one memory device, the method comprising:
   receiving a plurality of sensor information of operation of a generator;
   detecting an oscillation during operation of the generator from the plurality of sensor information;
   calculating a current damping ratio based on the plurality of sensor information including one or more vibration amplitudes;
   comparing the current damping ratio to a user defined threshold range to make a determination whether the current damping ration is within a user defined range;
   in response to the determination that the current damping ratio is not within the user defined threshold range, converting the oscillation into the time domain;
   in response to the determination that the current damping ratio is not within the user defined threshold range, determining a gain and a time constant to counteract the oscillation based upon the time domain oscillation; and
   in response to the determination that the current damping ratio is not within the user defined threshold range, transmitting, to the power system stabilizer, the gain and the time constant, wherein the power system stabilizer is configured to instruct an automatic voltage regulator to adjust its pulse output voltage based on the gain and the time constant.

9. The method in accordance with claim 8, wherein the plurality of sensor information is received at a first time, and wherein the method further comprises:
receiving a second plurality of sensor information at a subsequent time;
detecting a second oscillation during the operation of the generator from the second plurality of sensor information;
determining an updated gain and an updated time constant to counteract the second oscillation; and
transmitting, to the power system stabilizer, the updated gain and the updated time constant, wherein the power system stabilizer is configured to instruct the automatic voltage regulator to re-adjust its pulse output voltage based on the updated gain and the updated time constant.

10. The method in accordance with claim 8 further comprising in response to the determination that the current damping ratio is not within the user defined threshold range, increasing the gain.

11. The method in accordance with claim 8 further comprising determining a phase lead or a phase lag for the pulse output voltage of the automatic voltage regulator by comparing the oscillation to the pulse output voltage.

12. The method in accordance with claim 8, wherein the pulse output voltage is configured to counteract the oscillation.

13. The method in accordance with claim 12 further comprising calculating the time constant to align the pulse output voltage with the oscillation.

14. The method in accordance with claim 8, wherein the plurality of sensor information includes a voltage of the generator, a current of the generator, a frequency of the generator, and a shaft speed of the generator.

15. A computer device for controlling a power system comprising at least one processor in communication with at least one memory device and a power system stabilizer, wherein the at least one processor is programmed to:
receive a plurality of sensor information of operation of a generator;
detect an oscillation during operation of the generator from the plurality of sensor information;
calculate a current damping ratio based on the plurality of sensor information including one or more vibration amplitudes;
compare the current damping ratio to a user defined threshold range to make a determination whether the current damping ration is within a user defined range;
in response to the determination that the current damping ratio is not within the user defined threshold range, convert the oscillation into the time domain;
in response to the determination that the current damping ratio is not within the user defined threshold range, determine a gain and a time constant to counteract the oscillation based upon the time domain oscillation; and
in response to the determination that the current damping ratio is not within the user defined threshold range, transmit, to the power system stabilizer, the gain and the time constant, wherein the power system stabilizer is configured to instruct an automatic voltage regulator to adjust its pulse output voltage based on the gain and the time constant.

16. The computer device in accordance with claim 15, wherein the plurality of sensor information is received at a first time, and wherein the at least one processor is further programmed to:
receive a second plurality of sensor information at a subsequent time;
detect a second oscillation during the operation of the generator from the second plurality of sensor information;
determine an updated gain and an updated time constant to counteract the second oscillation; and
transmit, to the power system stabilizer, the updated gain and the updated time constant, wherein the power system stabilizer is configured to instruct the automatic voltage regulator to re-adjust its pulse output voltage based on the updated gain and the updated time constant.

17. The computer device in accordance with claim 15, wherein the at least one processor is further programmed to:
in response to the determination that the current damping ratio is not within the user defined threshold range, increase the gain.

18. The computer device in accordance with claim 15, wherein the pulse output voltage is configured to counteract the oscillation, and wherein the at least one processor is further programmed to calculate the time constant to align the pulse output voltage with the oscillation.

19. The system in accordance with claim 1, wherein the at least one processor is further programmed to in response to the determination that the current damping ratio is within the user defined threshold range, delay until additional sensor information is received.

20. The method in accordance with claim 8 further comprising in response to the determination that the current damping ratio is within the user defined threshold range, delaying until additional sensor information is received.

* * * * *